Figure 1:
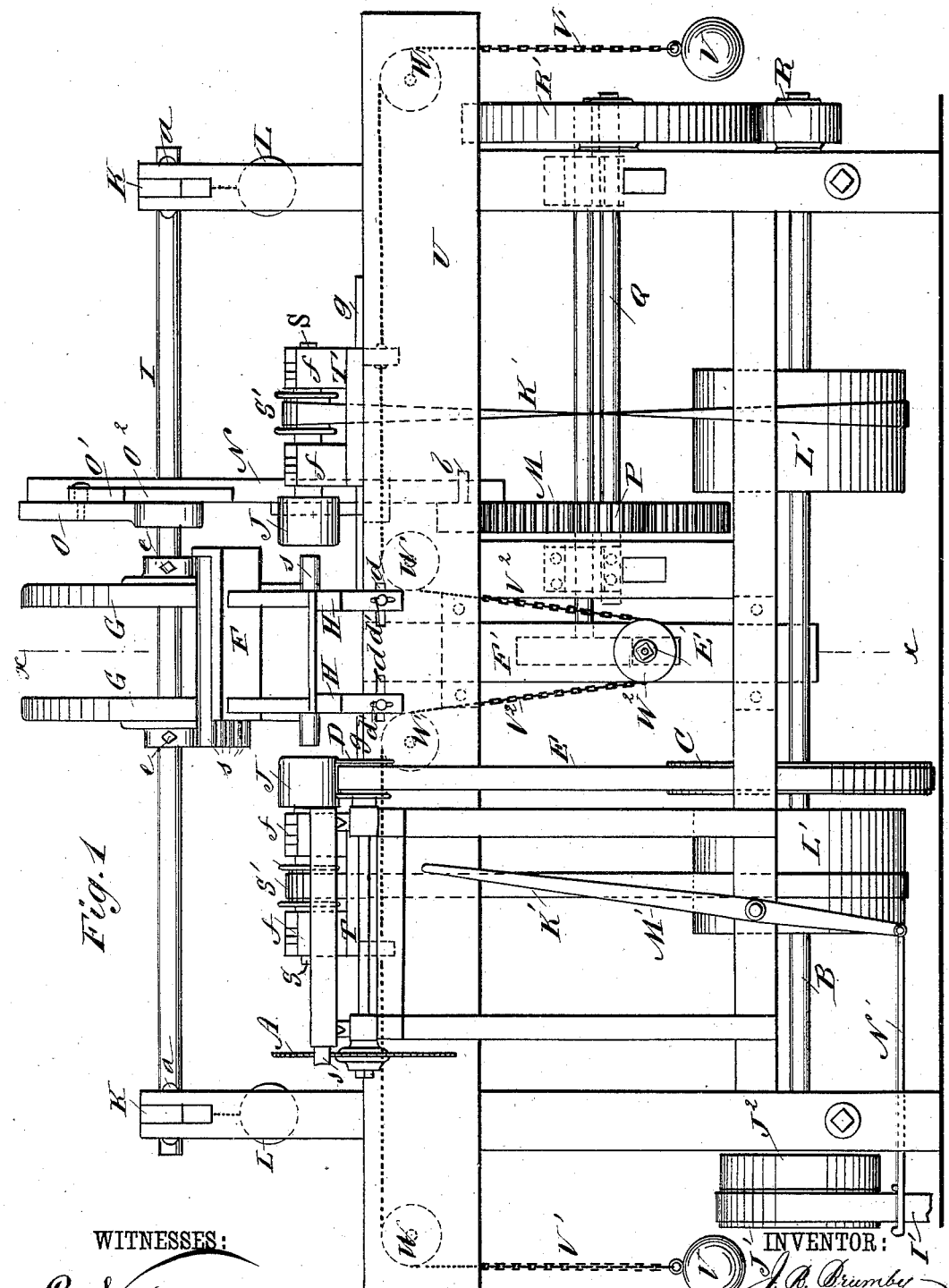

(No Model.) 2 Sheets—Sheet 1.

J. R. BRUMBY.
TENONING MACHINE.

No. 314,792. Patented Mar. 31, 1885.

WITNESSES:
C. Neveux
C. Sedgwick

INVENTOR:
J. R. Brumby
BY
ATTORNEYS.

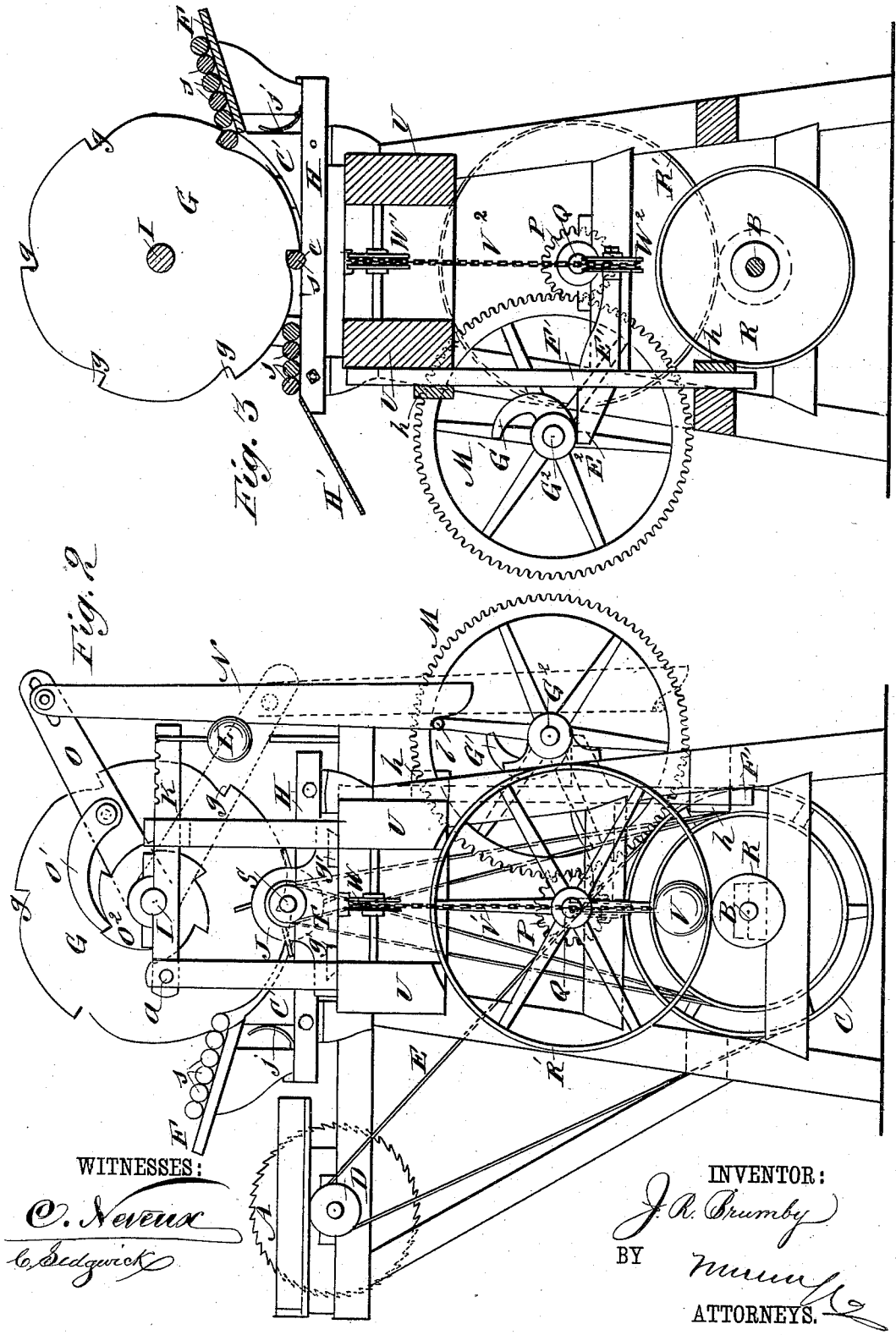

UNITED STATES PATENT OFFICE.

JAMES REMLEY BRUMBY, OF MARIETTA, GEORGIA, ASSIGNOR TO THE BRUMBY CHAIR COMPANY, OF SAME PLACE.

TENONING-MACHINE.

SPECIFICATION forming part of Letters Patent No. 314,792, dated March 31, 1885.

Application filed October 25, 1884. (No model.)

*To all whom it may concern:*

Be it known that I, JAMES REMLEY BRUMBY, of Marietta, in the county of Cobb and State of Georgia, have invented a new and Improved Tenoning-Machine, of which the following is a full, clear, and exact description.

This invention consists of a tenoning-machine wherein both ends of the stick are turned down or "tenoned" at the same time.

Reference is to be had to the accompanying drawings, forming part of this specification, in which similar letters of reference indicate corresponding parts in all the figures.

Figure 1 is a front elevation of my new tenoning-machine. Fig. 2 is an end elevation of the same, and Fig. 3 is a transverse sectional elevation taken on the line $x\ x$ of Fig.

In this instance the machine is provided with the saw A, which is revolved from the main power-shaft B by the pulleys C D and belt E for cutting the sticks $s$ to the proper length before they are fed into the machine. The sawing of the sticks may be done by a separate machine, if desired. After the sticks to be tenoned have been cut the proper length they are placed by the attendant upon the inclined table F, from which they are carried one at a time by the notched feed-wheels G down upon the cross-pieces H, and there held while they are tenoned by the cutters or hollow cutters J J. The feed-wheels G are fixed upon the shaft I, which is given an intermittent rotary motion, so that the feed-wheel G, after carrying a stick $s$ from the table F down to the cross-piece H, will dwell so as to rest upon the stick, and thus hold it while being tenoned by the cutters J. In order that the feed-wheels may thus hold the sticks effectually, and in order that the said wheels may readily accommodate themselves to sticks of different diameters, I journal the shaft I in or upon the arms K K, which are pivoted at $a$ and weighted at their free ends by the adjustable weights L L. The intermittent movement of the shaft I and feed-wheels G in this instance is derived from the large cog-wheel M, which, by means of the pin $b$, secured therein, and the connecting-rod N, raises the lever O and the pawl O', which latter engages with the ratchet $O^2$ on shaft I. When the pin $b$ in the revolution of the cog-wheel M passes the lower end of the connecting-rod N, this rod, the lever O, and pawl O' drop of their own weight to the position shown in dotted lines in Fig. 2, ready to be raised again by the pin $b$ in the next revolution of the cog-wheel M. The cog-wheel M derives its motion from the pinion P on shaft Q, which is revolved from the drive-shaft B by the friction-pulleys R R'. (Shown clearly in Figs. 1 and 2.) The cross-pieces H are, by preference, correspondingly notched at their upper edges, as shown at $c$, to cause the sticks $s$ to be more securely held by the notches $g$ of the feed-wheels G, and the said cross-pieces H are made adjustable by means of the slots $d\ d'$, so that they may be adjusted both sidewise and vertically, to suit sticks of different thickness and lengths. The feed-wheels G may also be adjusted to or from each other on the shaft I by loosening the set-screws $e$.

The cutters J J, that tenon the ends of the sticks, are of ordinary construction, and are secured upon the arbors or short shafts S S, that are journaled in the uprights $f\ f$ of the carriages T T, that are fitted to the under cut-away plates, $g'\ g'$, secured upon the upper surfaces of the parallel beams U U of the frame of the machine. The carriages T and cutters J are normally held drawn back to the positions shown in full lines in Fig. 1 by the weights V V, attached to the chains V' V', that pass over the pulleys W W and are attached to the outer ends of the carriages T, as illustrated in Fig. 1.

To the adjacent or inner ends of the carriages T is secured the ends of the chain $V^2$, which passes over the pulleys W' W', thence down under the pulley $W^2$, which is journaled upon the arm E', as shown clearly in Figs. 1 and 3. The arm E' is attached rigidly to the vertical bar F', that is held loosely to the frame of the machine by the keepers $h\ h$, as shown clearly in Fig. 3. The arm E' reaches past the bar F' and forms the projection $E^2$, (shown in Fig. 3,) against which the cam G' on shaft $G^2$, (upon which the above-mentioned large cog-wheel M is secured,)

strikes as the said shaft is revolved, so that the bar F', arm and projection E' E², and pulley W² will be depressed by the cam G' with each revolution of the shaft G². The downward movement of these parts will draw downward the chain V², which will simultaneously draw forward the carriages T T and apply the cutters J J to the ends of the sticks to be tenoned. When the cam G' passes the projection E², the weights V will act to withdraw the carriages T and cutters J from the ends of the stick, and also, through chain V², to lift the bar F', arm and projection E' E², and pulley W² to their original position, ready for another operation. The movement of the feed-wheels G is so timed with the sliding movements of the cutters J that they discharge the tenoned stick over the inclined table H' and bring another stick to position to be tenoned while the cutters make their backward and forward movements.

Power is applied to the machine by a belt, I', coming from any suitable motor and passing over the pulley J', secured upon the main drive-shaft B, and the cutters J are revolved by the belts K' K', passing over the broad pulleys L' L' on shaft B and pulleys S' S' on arbors S S, and one of the belts K' is crossed so that the cutters J J will be revolved in opposite direction, thus causing each cutter to counteract the tendency of the other to revolve the stick. A loose pulley, J², is placed upon the shaft B, to which the belt I' may be shipped by the shipping-lever and rod M' N' when it is desired to stop the tenoning-machine without stopping the motive power.

To prevent displacement of the sticks in being carried from the table F to the cross-pieces H, I employ the curved blocks C' C', placed upon the cross-pieces H in front of the feed-wheels G, so that the sticks in their descent will be held in close contact with the edges of the feed-wheel, and, back of the blocks C', I place the springs $j\ j$, that permit the blocks C' to have a yielding movement, so that they will hold sticks of different sizes.

Constructed and operated as described, it will be seen that the machine is automatic in its action and that both ends of the sticks will be tenoned at the same time, and, owing to the exact alignment of the cutters J, the tenons will always be exactly in line with each other, so that no further operation is necessary to fit the sticks for use.

Having thus described my invention, what I claim as new, and desire to secure by Letters Patent, is—

1. In a tenoning-machine, the sliding cutter-carriages normally held at distant points, in combination with a slide carrying a fixed arm with one end acted upon by a cam on a shaft driven from the driving-shaft, the other end of said arm carrying a pulley acting upon a cord connected to the cutter-carriages, said carriages being automatically returned to their normal positions after the escape of said cams from said arm, substantially as and for the purpose set forth.

2. In a tenoning-machine, the sliding cutter-carriages, in combination with the weighted chains connected to the outer ends of said carriage and passed over pulleys at distant ends of the carriage support or table, the additional chain with its ends connected to the inner ends of said carriage and passed over pulleys and down under an intermediate pulley, said latter pulley being supported upon a fixed arm of a slide, and a cam carried by a shaft driven from the driving-shaft, said cam acting upon one end of said fixed arm, substantially as and for the purpose set forth.

3. In a tenoning-machine, the sliding cutter-carriages with their end pieces supported upon rails fitting in under-cut grooves of said end-pieces, and with their cutters mounted upon arbors, one driven by a crossed belt, in combination with weighted chains passed over pulleys at the distant ends of the carriage-table and connected to the outer ends of said carriages, an additional chain connected to the inner ends of the carriages and passed over pulleys and down under an intermediate pulley, a slide having a fixed arm carrying said intermediate pulley, a cam carried by a shaft and acting upon said pulley-carrying arm, said shaft gearing with a second shaft driven from the driving-wheel, substantially as and for the purpose set forth.

4. In a tenoning-machine, the sliding cutter-carriages and the slide having a fixed arm carrying a pulley acting upon a cord connected to said carriages, said arm being acted upon by a cam carried by a shaft geared to a shaft driven by the driving-shaft, in combination with the work-feeding wheels having connection with the gearing of the shaft having the aforesaid cam by intermittently-actuating mechanism, substantially as and for the purpose set forth.

5. In a tenoning-machine, the sliding cutter-carriages automatically moved from each other, and the slide having a fixed arm carrying a pulley acting upon a cord connected to said carriages, said arm being acted upon by a cam carried by a shaft geared to a shaft driven by the driving-shaft, in combination with the work-feeding wheels with their shaft carrying a ratchet engaged by a pawl pivoted to a lever connected to a rod engaging with a projection of the gear-wheel upon the shaft of the aforesaid cam, substantially as and for the purpose set forth.

JAMES REMLEY BRUMBY.

Witnesses:
JNO. B. CAMPBELL,
R. B. SIMPSON.